(12) United States Patent
Larsson (10) Patent No.: US 11,998,931 B2
(45) Date of Patent: Jun. 4, 2024

(54) CENTRIFUGAL SEPARATOR HAVING A GENERATOR FOR GENERATING AN ELECTRIC CURRENT

(71) Applicant: ALFA LAVAL CORPORATE AB, Lund (SE)

(72) Inventor: Per-Gustaf Larsson, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 754 days.

(21) Appl. No.: 16/620,167

(22) PCT Filed: Jun. 11, 2018

(86) PCT No.: PCT/EP2018/065356
§ 371 (c)(1),
(2) Date: Dec. 6, 2019

(87) PCT Pub. No.: WO2018/228992
PCT Pub. Date: Dec. 20, 2018

(65) Prior Publication Data
US 2021/0146379 A1    May 20, 2021

(30) Foreign Application Priority Data
Jun. 15, 2017    (EP) .................................... 17176208

(51) Int. Cl.
*B04B 9/02*        (2006.01)
*B04B 1/08*        (2006.01)
(Continued)

(52) U.S. Cl.
CPC ................. *B04B 9/02* (2013.01); *B04B 1/08* (2013.01); *B04B 13/00* (2013.01); *H02K 19/20* (2013.01);
(Continued)

(58) Field of Classification Search
CPC .. B04B 9/02; B04B 1/08; B04B 13/00; B04B 9/10; H02K 19/20; H02K 19/16;
(Continued)

(56) References Cited

U.S. PATENT DOCUMENTS 2,732,509 A * 1/1956 Hammerstrom ....... H02K 99/20
310/168
3,695,509 A * 10/1972 Javet .................. B01D 17/0217
494/76

(Continued)

FOREIGN PATENT DOCUMENTS

CN        1383927 A    12/2002
CN      102575905 A     7/2012
(Continued)

OTHER PUBLICATIONS

JP 2005354886 Machine Translation.*
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP (57) ABSTRACT

A centrifugal separator includes a rotor arrangement and a drive arrangement. The centrifugal separator includes a generator for generating an electric current. The generator is configured for continuously generating a current during a full revolution of the rotor arrangement. The current is utilised for supplying electric current to a user of electric energy arranged in the rotor arrangement.

12 Claims, 7 Drawing Sheets

(51) Int. Cl.
  *B04B 13/00* (2006.01)
  *H02K 19/20* (2006.01)
  *B01D 17/02* (2006.01)
  *B01D 19/00* (2006.01)
(52) U.S. Cl.
  CPC ...... *B01D 17/0217* (2013.01); *B01D 19/0052* (2013.01)
(58) Field of Classification Search
  CPC ........ H02K 19/18; H02K 19/22; H02K 19/24; H02K 19/26; H02K 19/28; H02K 19/30; H02K 19/32; B01D 17/0217; B01D 19/0052
  USPC .............................. 494/3, 10, 27, 37, 45, 17
  See application file for complete search history.

(56) References Cited

U.S. PATENT DOCUMENTS

| | | | |
|---|---|---|---|
| 3,986,663 A | 10/1976 | Jonsson | |
| 5,529,566 A * | 6/1996 | Weil .................... | B04B 1/2016 494/7 |
| 6,011,490 A * | 1/2000 | Tonnesen ............... | G01F 23/26 340/870.3 |
| 6,368,075 B1 | 4/2002 | Fremerey | |
| 6,572,523 B2 | 6/2003 | Herman et al. | |
| 6,605,474 B1 | 8/2003 | Cole | |
| 7,338,426 B2 | 3/2008 | Samways | |
| 7,635,328 B2 | 12/2009 | Hinman et al. | |
| 9,039,992 B2 | 5/2015 | Fritchie | |
| 2003/0233932 A1 | 12/2003 | Ekeroth | |
| 2004/0046473 A1* | 3/2004 | Koeneman ............ | H02K 7/025 310/178 |
| 2005/0012475 A1 | 1/2005 | Takeuchi | |
| 2006/0000787 A1* | 1/2006 | Galasso, III ........... | C10G 31/10 494/67 |
| 2006/0011563 A1* | 1/2006 | Meikrantz .......... | B01D 17/0217 494/22 |
| 2007/0173397 A1* | 7/2007 | Hinman .................. | B04B 11/04 210/744 |
| 2010/0230355 A1* | 9/2010 | Kerr .................... | B01D 15/1892 210/198.2 |
| 2012/0090822 A1 | 4/2012 | Francois et al. | |

FOREIGN PATENT DOCUMENTS

| | | | | |
|---|---|---|---|---|
| EP | 1 247 584 A2 | | 10/2002 | |
| EP | 2644278 A1 | * | 10/2013 | ............. B04B 13/00 |
| JP | 50-131156 A | | 10/1975 | |
| JP | 61-269646 A | | 11/1986 | |
| JP | 4-267957 A | | 9/1992 | |
| JP | 6-505862 A | | 6/1994 | |
| JP | 2005354886 A | * | 12/2005 | |
| JP | 2008-224652 A | | 9/2008 | |
| JP | 2008-543558 A | | 12/2008 | |
| JP | 2012-228684 A | | 11/2012 | |
| KR | 10-1346540 B1 | | 12/2013 | |
| WO | WO 93/12860 A1 | | 7/1993 | |

OTHER PUBLICATIONS

International Search Report, issued in PCT/EP2018/065356, dated Jul. 5, 2018.
Written Opinion of the International Searching Authority, issued in PCT/EP2018/065356, dated Jul. 5, 2018.
English translation of Chinese Office Action and Search Report for Chinese Application No. 201880039352.4 dated Aug. 31, 2020.
Korean Office Action for Korean Application No. 10-2020-7000817, dated Jul. 19, 2021, with English translation.
Japanese Office Action for Japanese Application No. 2019-569478, dated Jan. 4, 2021, with English translation.

* cited by examiner

CENTRIFUGAL SEPARATOR HAVING A GENERATOR FOR GENERATING AN ELECTRIC CURRENT

TECHNICAL FIELD

The invention relates to a method of operating a centrifugal separator, and to a centrifugal separator.

BACKGROUND

A centrifugal separator comprises a rotor arrangement and a drive arrangement. The rotor arrangement comprises a spindle and a separator bowl. The drive arrangement is configured for rotating the rotor arrangement about a rotational axis having a vertical axis of rotation. Inside the separator bowl there is a separation space in which a stack of frustoconical separation discs is arranged. A fluid feed mixture is fed into the separation space and the disc stack, and is separated into at least a light fluid phase and a heavy fluid phase during rotation of the rotor. The light and heavy fluid phases may be continuously led out of the rotor.

U.S. Pat. No. 6,011,490 discloses an apparatus for measurement of a position of an interface between two fluids in a centrifuge rotor during rotation. The apparatus comprises an electric or magnetic sensor mounted internally on a wall in the centrifuge rotor, and means for contact-free and intermittent transmission of measurement signals from the sensor to a stationary measuring unit outside the centrifuge rotor. The sensor comprises an active electronic circuit adapted to store measurement values that are recorded during at least a portion of a revolution of the rotor, before said transmission of corresponding measurement signals to the measuring unit. Electric power supply to the electronic circuit is provided for by generator means comprising a stationary magnet near the rotor and a coil mounted in the rotor so that a voltage is induced in the coil during movement past the magnet means during a portion of one rotation of the rotor.

U.S. Pat. No. 7,635,328 discloses a centrifuge including a provision for measuring a physical parameter corresponding to a position of a phase interface inside the centrifuge. The centrifuge is controlled responsive to the inferred position of the phase interface. A conductivity sensor is arranged inside a rotor of the centrifuge. An electronic interface is configured to intermittently receive conductivity data from the conductivity sensor as the sensor rotates past a position of the electronic interface arranged beside the rotor. The electronic interface is operable to induce a current flow in the conductivity sensor and thereby to provide intermittent power to the sensor sufficient to measure and transmit conductivity.

SUMMARY

It is an object of the invention to ensure stable operating conditions for a user of electric energy in a rotor arrangement of a centrifugal separator having a vertical axis of rotation.

According to an aspect of the invention, the object is achieved by a method of operating a centrifugal separator. The centrifugal separator comprises a rotor arrangement, a drive arrangement, and a user of electric energy. The rotor arrangement has a vertical rotational axis and comprises a spindle and a separator bowl. The drive arrangement is connected to, or forms part of, the spindle. The centrifugal separator comprises a generator for generating an electric current. The method comprises steps of:
rotating the rotor arrangement about the rotational axis with the drive arrangement,
continuously generating a current with the generator during a full revolution of the rotor arrangement during the step of rotating the rotor arrangement, and
supplying electric current to the user of electric energy arranged in the rotor arrangement utilising the current generated during the step of continuously generating a current.

Since the method comprises steps of continuously generating a current with the generator during a full revolution of the rotor arrangement, and supplying electric current to the user of electric energy arranged in the rotor arrangement, the user of electric energy in the rotor arrangement is able to operate inside the rotor arrangement as the rotor arrangement rotates. Thus, stable operating conditions are provided for the user of electric energy. As a result, the above mentioned object is achieved.

According to a further aspect of the invention, the object is achieved by a centrifugal separator comprising a rotor arrangement and a drive arrangement. The rotor arrangement comprises a spindle, a separator bowl, and a user of electric energy. The drive arrangement is connected to, or forms part of, the spindle and is configured to rotate the rotor arrangement about a vertical rotational axis. The centrifugal separator comprises a generator for generating an electric current. The generator is configured for continuously generating a current during a full revolution of the rotor arrangement. The current is utilised for supplying electric current to the user of electric energy arranged in the rotor arrangement.

Since the generator is configured for continuously generating a current during a full revolution of the rotor arrangement, and the current is utilised for supplying electric current to the user of electric energy arranged in the rotor arrangement, the user of electric energy in the rotor arrangement is able to operate inside the rotor arrangement as the rotor arrangement rotates. Thus, stable operating conditions are provided for the user of electric energy. As a result, the above mentioned object is achieved.

Due to the step of continuously generating a current with the generator during a full revolution of the rotor arrangement during the step of rotating the rotor arrangement, and the generator being configured for continuously generating a current during a full revolution of the rotor arrangement, respectively, the user of electric energy may operate continuously as the rotor arrangement rotates, i.e. not only intermittently as in prior art centrifugal separators. Thus, the user of electric energy may not only comprise low current consumers such as sensors, but additionally or alternatively high current consumers such as actuators.

The centrifugal separator may be configured for separating a fluid feed mixture into at least a light fluid phase and a heavy fluid phase. Inside the separator bowl there is a separation space wherein a stack of frustoconical separation discs may be arranged. The user of electric energy may be a large current consumer in comparison with electric energy users inside rotor arrangements of prior art centrifugal separators. The user of electric energy may comprise one large electric energy consumer, or several electric energy consumers.

According to embodiments, the centrifugal separator may comprise an actuator arranged in the rotor arrangement, the actuator forming at least part of the user of electric energy. In this manner, the actuator may be supplied with electric energy from the generator. Since the generator continuously generates a current, the actuator may be continuously supplied with electric energy. Thus, the actuator may operate continuously as the rotor arrangement rotates. Accordingly, from within the rotor arrangement, the actuator may control aspects, characteristics, performance, etc. of the centrifugal separator and/or the separation performed by the centrifugal separator.

According to embodiments, the centrifugal separator may comprise a sensor arranged in the rotor arrangement, the sensor forming at least part of the user of electric energy. In this manner, the sensor may be supplied with electric energy from the generator. Since the generator continuously generates a current, the sensor may be continuously supplied with electric energy. Thus, the sensor may operate continuously as the rotor arrangement rotates. Accordingly, from within the rotor arrangement, the sensor may sense parameters, aspects, characteristics, performance, etc. of the centrifugal separator and/or the separation performed by the centrifugal separator.

According to embodiments, the centrifugal separator may comprise a control unit arranged in the rotor arrangement, the control unit forming at least part of the user of electric energy. In this manner, the control unit may be supplied with electric energy from the generator. Since the generator continuously generates a current, the control unit may be continuously supplied with electric energy. Thus, the control unit may operate continuously as the rotor arrangement rotates. Accordingly, from within the rotor arrangement, the control unit may control and/or monitor parameters, aspects, characteristics, performance, etc. of the centrifugal separator and/or the separation performed by the centrifugal separator. The control unit may communicate with equipment outside the rotor arrangement.

The features of, and advantages with, the invention discussed in the following detailed description relate to all aspects of the invention.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
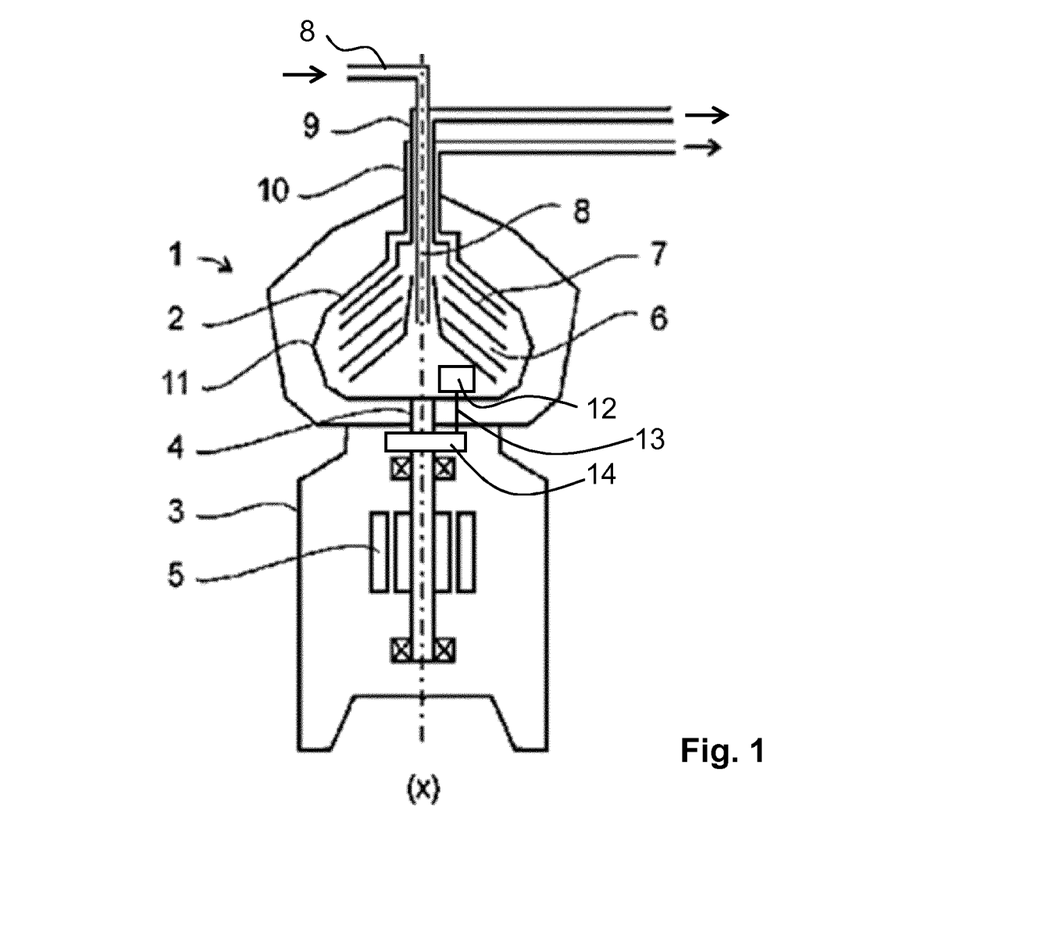
FIG. 1 schematically illustrates a cross section through a centrifugal separator, having a vertical axis of rotation, according to embodiments.

FIG. 1 schematically illustrates a cross section through a centrifugal separator 1 according to embodiments. The centrifugal separator 1 comprises a rotor arrangement 2 and a drive arrangement 5. The rotor arrangement 2 comprises a separator bowl 11 and a spindle 4. The spindle 4 is supported in a housing 3 of the centrifugal separator 1, e.g. via two bearings. The housing 3 may comprise more than one individual part and thus, may be assemble from several parts. The drive arrangement 5 is configured to rotate the rotor arrangement 2 about a vertical rotational axis (X).

In these embodiments, the drive arrangement 5 forms part of the spindle 4. That is, the rotor arrangement 2 is directly driven by the drive arrangement 5. The drive arrangement 5 comprises an electric motor and a rotor of the electric motor forms part of the spindle 4. In alternative embodiments, the drive arrangement may instead be connected to the spindle. Such alternative embodiments may comprise an electric motor connected e.g. via cog wheels, or a belt drive, to the spindle.

Inside the separator bowl 11 there is formed a separation space 6 in which centrifugal separation of a fluid feed mixture takes place. In the separation space 6 there is arranged a stack of frusto-conical separation discs 7. The separation discs 7 provide for an efficient separation of the fluid feed mixture into at least a light fluid phase and a heavy fluid phase. The stack of frusto-conical separation discs 7 is fitted centrally and coaxially with the vertical rotational axis (X).

The centrifugal separator 1 may be configured for separating the fluid feed mixture into at least the light fluid phase and the heavy fluid phase. The fluid feed mixture may comprise e.g. a liquid and a gas, or two liquids. The fluid feed mixture may comprise solid matter, which may be separated in the form of sludge from the fluid feed mixture in the centrifugal separator 1.

In the illustrated embodiments, the fluid feed mixture to be separated is fed from the top of the centrifugal separator 1 via an inlet pipe 8 centrally down into the separator bowl 11. The separator bowl 11 has extending from it a light fluid phase outlet 9 for a lower density component separated from the fluid feed mixture extending through the housing 3 at the top of the centrifugal separator 1. Also, the separator bowl 11 has extending from it a heavy fluid phase outlet 10 for a higher density component separated from the fluid feed mixture extending through the housing 3 at the top of the centrifugal separator 1. The separator may comprise further outlets for further phases having other densities than the densities of the light and heavy fluid phases withdrawn via outlets 9, 10. For instance sludge may be ejected from the separator bowl 11 via nozzles arranged at an outer periphery of the separator bowl 11.

The present invention is not limited to any particular types of fluid feed mixtures or separated fluid phases. Neither is the present invention limited to any particular inlet arrangement for the fluid feed mixture, nor to any particular outlet arrangements for the separated fluid phases.

The rotor arrangement 2 comprises a user of electric energy 12. The centrifugal separator 1 comprises a generator 14 for generating an electric current. The generator 14 is configured for continuously generating a current during a full revolution of the rotor arrangement 2. The current is utilised for supplying electric current to the user of electric energy 12 arranged in the rotor arrangement 2. The current may be supplied from the generator 14 to the user of electric energy 12 via an electric circuit 13. The electric circuit 13 may at least comprise conductors leading from the generator 14 to the user of electric energy 12.

The continuously generated current may be a continuous AC current during a full revolution of the rotor arrangement 2, or a continuously pulsed DC current during a full revolution of the rotor arrangement 2. The continuous AC current or the continuously pulsed DC current may be rectified in a rectifier arrangement (not shown) before being utilised as electric energy by the user of electric energy 12. Since the generator 14 is configured for continuously generating a current during a full revolution of the rotor arrangement 2, the user of electric energy 12 may utilise the electric energy provided in the form of the current from the generator 14 during the full revolution of the rotor arrangement 2.

Figure 2A:
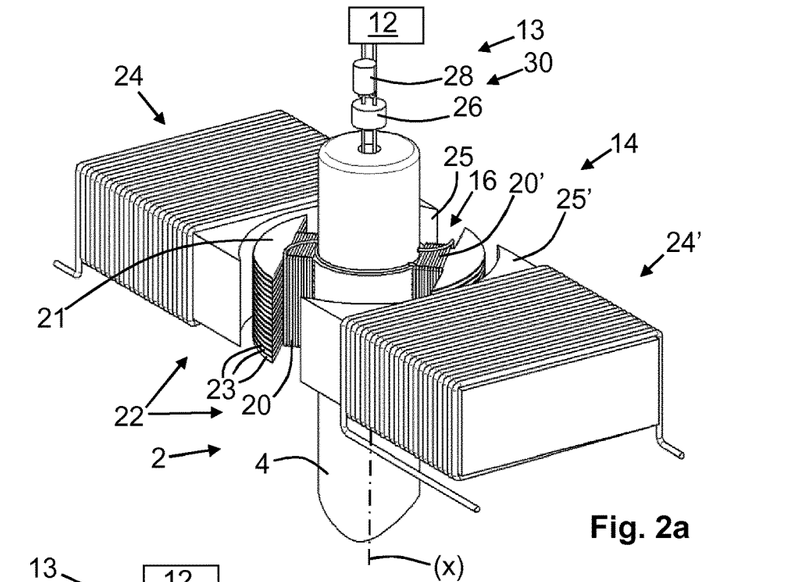
FIGS. 2a-2c illustrate embodiments of a generator of a centrifugal separator.
Figure 2B:
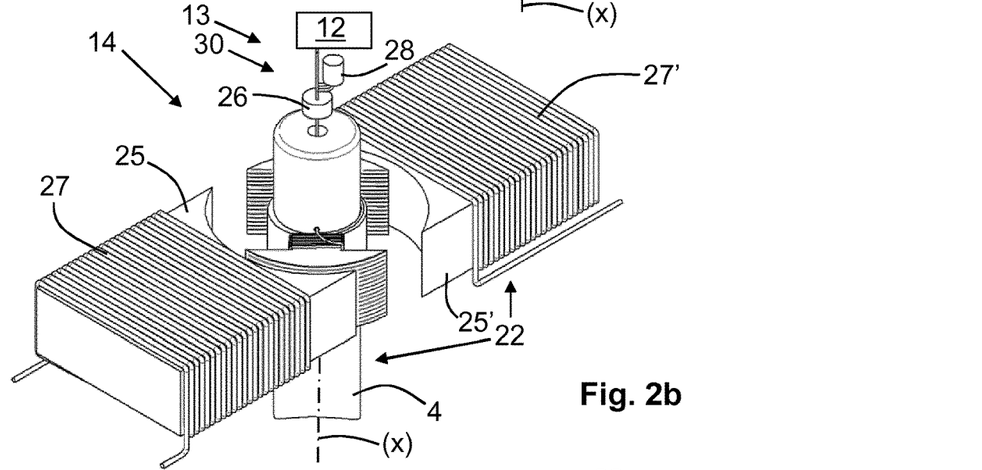
Figure 2C:
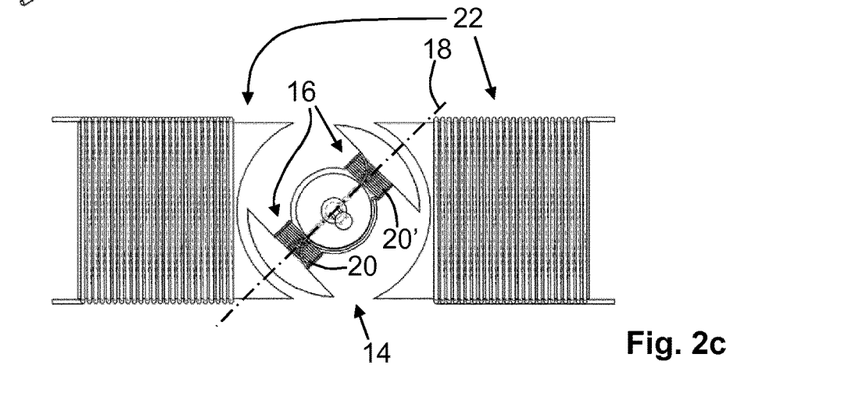

FIGS. 2a-2c illustrate embodiments of a generator 14 of a centrifugal separator, e.g. such as the centrifugal separator 1 of FIG. 1.

The generator 14 is configured for continuously generating a current during a full revolution of a rotor arrangement 2 of the centrifugal separator. The current is utilised for supplying electric current to a user of electric energy 12 arranged in the rotor arrangement 2, during the full revolution of the rotor arrangement 2. A portion of a spindle 4 of the rotor arrangement 2 is schematically shown in FIGS. 2a-2c. The rotor arrangement 2 further comprises a separator bowl (not shown).

The generator 14 comprises a coil 16 arranged to rotate with the rotor arrangement 2. The coil 16 has a coil axis 18 extending substantially perpendicularly to a vertical rotational axis (X) of the rotor arrangement 2. In this manner, the coil 16 and the coil axis 18 may be rotated through a magnetic field extending across the rotor arrangement 2 in order to generate a continuous AC current in the coil 16 of the generator 14. In the alternative case of e.g. two opposed magnetic fields extending perpendicularly to the rotational axis (X), the coil 16 and the coil axis 18 may be rotated through the magnetic fields, generating a pulsed DC current in the coil 16 of the generator 14.

The coil axis 18 extends along a centre of the coil 16. Put differently, windings of the coil 16 extend around the coil axis 18.

The coil 16 comprises a conductor forming a number of coil windings. The conductor is electrically insulated such that individual coil windings are isolated from each other, i.e. the coil windings are not short circuited. The coil 16 is connected to a user of electric energy 12 arranged in the rotor arrangement 2. More specifically, the two ends of the coil 16 are connected to the user of electric energy 12, e.g. via a rectifier bridge 26 and a capacitor 28 for rectifying AC current, or via a smoothing capacitor for smoothing a pulsating DC current, in order to provide a DC current to the user of electric energy 12.

Thus, the centrifugal separator may comprise a rectifier arrangement 30 arranged in the rotor arrangement 2 and electrically connected to the generator 14. The rectifier arrangement 30 may be configured for providing a continuous DC current during rotation of the rotor arrangement 2. The rectifier arrangement 30 may comprise the rectifier bridge 26 and the capacitor 28.

Accordingly, the current may be supplied from the coil 16 of the generator 14 to the user of electric energy 12 via an electric circuit 13, which may comprise e.g. conductors and the rectifier arrangement 30. In embodiments wherein the generator generates a pulsating DC current, the electric circuit may comprise e.g. conductors and a smoothing capacitor.

In FIGS. 2a-2c the spindle 4, the rectifier bridge 26, the capacitor 28, and the user of electric energy 12 are only schematically shown. In practice, the spindle 4 may be longer in order to support the separator bowl and for connection to, or incorporation in, the drive arrangement of the centrifugal separator. The rectifier bridge 26 and the capacitor and 28 may be arranged adjacent to, or at a distance from, the spindle 4. The user of electric energy 12 may be arranged in any suitable position in the rotor arrangement 2 for it to perform its operative function in the rotor arrangement 2.

The coil 16 may comprise a first coil portion 20 and a second coil portion 20', the first and second coil portions 20, 20' being arranged on opposite sides of the rotational axis (X). In this manner, the coil 16 may be arranged to extend symmetrically about the rotational axis (X). Thus, conditions for generating the continuous AC current with the generator 14 are provided. Alternatively, conditions for generating the continuously pulsed DC current with the generator 14 are provided.

The generator 14 comprises a magnet element 22 arranged stationary in the centrifugal separator 1. The magnet element 22 is arranged to provide a magnetic field extending across the rotational axis (X). In this manner, a continuous AC current may be generated in the coil 16 since the magnetic field will influence the coil 16 on both sides of the rotational axis (X).

The coil 16 may be wound about a ferritic core 21. Thus, the magnetic field from the magnet element 22 may be strengthened within the coil 16. Accordingly, also the continuous AC current generated in the coil 16 may be strengthened. The ferritic core 21 may comprise a number of separate core layers 23 stacked on top of each other. Thus, the magnetic field from the magnet element 22 will be less disturbed in the ferritic core 21 than if the ferritic core were made of a solid block of material.

According to some embodiments, the magnet element 22 may comprises a first magnet member 24 and a second magnet member 24'. The first and second magnet members 24, 24' may be arranged on opposite sides of the rotational axis (X). In this manner, the magnetic field may be provided on both sides of the rotational axis (X), the first and second magnet members 24, 24' having their north and south magnetic poles arranged to provide one magnetic field in between the first and second magnet members 24, 24'.

In these embodiments, the magnet element 22 comprises at least one electromagnet. For instance, each of the first and second magnet members 24, 24' may form an electromagnet. As known in the field of electromagnets, each electromagnet may comprise a ferritic core 25, 25' with a coil 27, 27' wound around the ferritic core. As a current flows through the coil 27, 27' of the electromagnet, a magnetic field is generated. One of the electromagnets may have its north magnetic pole pointed towards the rotational axis (X), and the other of the electromagnets has its south magnetic pole pointed towards the rotational axis (X). In this manner, the magnetic fields of the electromagnets enforce each other.

The ferritic cores 25, 25' of the electromagnets form a space there between, the space having a substantially circular cross section. The substantially circular cross section extends perpendicularly to the rotational axis (X). The coil 16 of the generator 14 arranged at the rotational axis (X) rotates within the space having a substantially circular cross section. Thus, the coil 16 may rotate within a strong magnetic field.

Similarly to the ferritic core 21 of the coil 16, the ferritic cores 25, 25' of the electromagnets may comprise a number of separate core layers stacked on top of each other (not shown).

According to some embodiments, a strength of a current to the at least one electromagnet may be controllable for changing a strength of the magnetic field provided by the at least one electromagnet. In this manner, the strength of the continuous AC current generated by the generator 14 may be controlled. For instance, at low rotational speeds of the rotor arrangement 2, a high current may be provided to the at least one electromagnet in order to compensate for the low rotational speed, and to provide a sufficiently strong current to the user of electric energy in the rotor arrangement 2. A different example may be, that the user of electric energy 12 in the rotor arrangement 2 consumes different amounts of electric energy at different times during the operation of the centrifugal separator. In such cases, the strength of the continuous AC current generated by the generator 14 may be increased by increasing the current to the at least one electromagnet when the user of electric energy 12 consumes a high amount of electric energy, and the strength of the continuous AC current generated by the generator 14 may be decreased by decreasing the current to the at least one electromagnet when the user of electric energy 12 consumes a low amount of electric energy. Also, the generator 14 may be switched off entirely by switching off the current to the at least one electromagnet, e.g. when the user of electric energy 12 in the rotor arrangement 2 does not require any electric energy.

Figure 3:
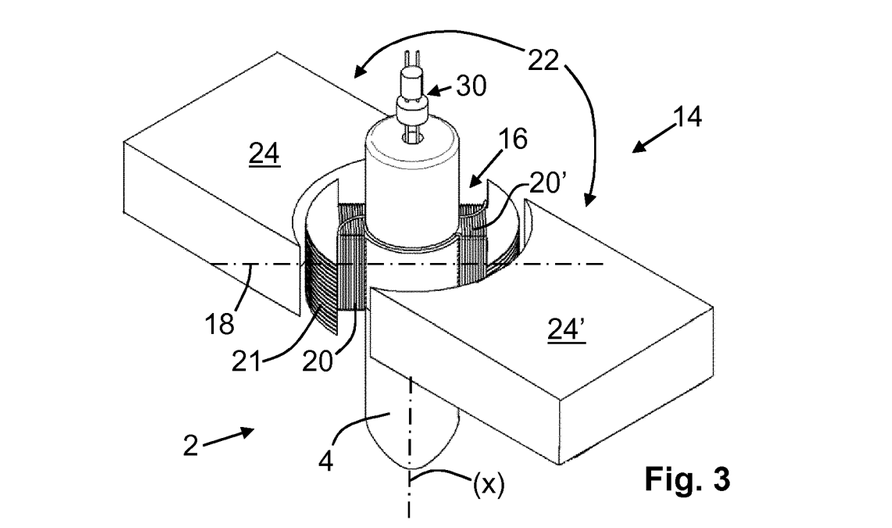
FIG. 3 illustrates embodiments of a generator of a centrifugal separator, FIG. 4a schematically illustrates a side view a rotor arrangement of a centrifugal separator according to embodiments, FIG. 4b schematically illustrates a top view of the rotor arrangement, FIG. 5a schematically illustrate a drive arrangement of a centrifugal separator, FIG. 5b schematically illustrates a top view of the drive arrangement 5, FIGS. 6a-6c schematically illustrate cross sections of centrifugal separators having vertical axis of rotation.

FIG. 3 illustrates embodiments of a generator 14 of a centrifugal separator, e.g. such as the centrifugal separator 1 of FIG. 1. These embodiments resemble in much the embodiments of FIGS. 2a-2c. Reference is thus, made to the discussion above related to the embodiments of FIGS. 2a-2c, and in particular to the discussion of the coil 16, the coil axis 18, the first and second coil portions 20, 20', the ferritic core 21 of the coil 16, and the rectifier arrangement 30. The main differences between the embodiments of FIG. 3 and FIGS. 2a-2c will be discussed in the following.

Again, the generator 14 is configured for continuously generating a current during a full revolution of a rotor arrangement of the centrifugal separator. The is utilised for supplying electric current to a user of electric energy arranged in the rotor arrangement e.g. during the full revolution of the rotor arrangement 2. A portion of a spindle 4 of the rotor arrangement 2 is schematically shown in FIG. 3. The rotor arrangement 2 further comprises a separator bowl (not shown).

Again, the generator 14 comprises a magnet element 22 arranged stationary in the centrifugal separator. The magnet element 22 is arranged to provide a magnetic field extending across the rotational axis (X).

In these embodiments, the magnet element 22 comprises at least one permanent magnet. In this manner, no electric energy is required to generate the magnetic field, as is required in the embodiments of FIGS. 2a-2c comprising at least one electromagnet.

The magnet element 22 may comprise a first magnet member 24 and a second magnet member 24'. The first and second magnet members 24, 24' may be arranged on opposite sides of the rotational axis (X). In this manner, the magnetic field may be provided by permanent magnets on both sides of the rotational axis (X).

One of the permanent magnets may have its north magnetic pole pointed towards the rotational axis (X), the other of the permanent magnets has its south magnetic pole pointed towards the rotational axis (X). In this manner, the magnetic fields of the first and second magnet members 24, 24' strengthen each other.

The first and second magnet members 24, 24' form a space there between, the space having a substantially circular cross section. The substantially circular cross section extends perpendicularly to the rotational axis (X). The coil 16 of the generator 14 arranged at the rotational axis (X) rotates within the space having a substantially circular cross section. Thus, the coil 16 may rotate within a strong magnetic field provided by the first and second magnet members 24, 24'.

In the embodiments of FIGS. 2a-2c, and FIG. 3, the coil 16 is arranged on the spindle 4 to rotate with the spindle 4, and the magnet element 22 is arranged adjacent to the spindle 4.

Thus, the generator 14 is arranged at the spindle 4 of the rotor arrangement 2.

As shown in FIG. 1, the generator 14 may be arranged on the spindle 4 on a same axial side of the separator bowl 11 as the drive arrangement 5.

In alternative embodiments, the spindle 4 may extend through the separator bowl 11. In such embodiments, the generator 14 may be arranged at the spindle 4 on an axial side of the separator bowl 11 opposite to wherein the drive arrangement 5 is connected to, or forms part of, the spindle 4.

According to further embodiments, the generator 14 may be arranged on a separate structure provided at the spindle 4 or at the separator bowl. The separate structure may be dedicated for supporting the generator 14.

Figure 4A:
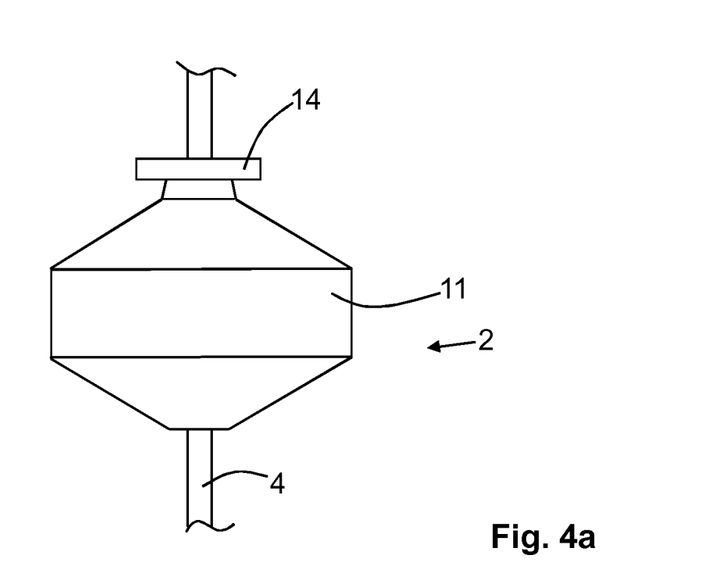
Figure 4B:
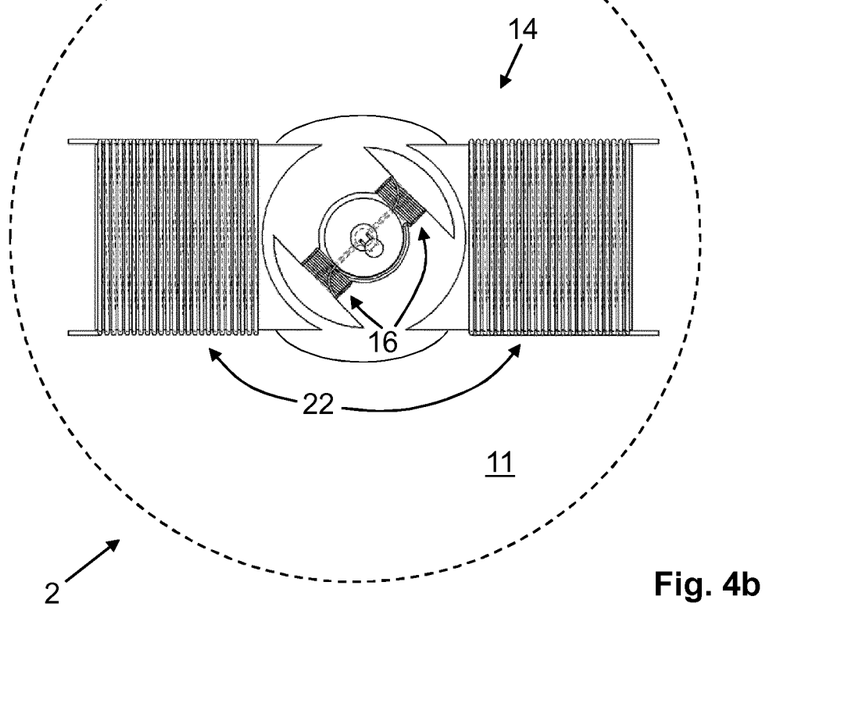

FIG. 4a schematically illustrates a side view of a rotor arrangement 2 of a centrifugal separator according to embodiments. FIG. 4b schematically illustrates a top view of the rotor arrangement 2. The centrifugal separator may be a centrifugal separator 1 as discussed above in connection with FIG. 1.

In these embodiments, a generator 14 configured for continuously generating a current during a full revolution of the rotor arrangement 2 of the centrifugal separator, is arranged at the separator bowl 11. The separator bowl 11 is schematically indicated with a broken line in FIG. 4b. Again, the current is utilised for supplying electric current to a user of electric energy arranged in the rotor arrangement 2, e.g. during the full revolution of the rotor arrangement 2.

Again, the generator 14 comprises a coil 16 and a magnet element 22, according to any of the embodiments as discussed above with reference to of FIGS. 2a-2c, and 3. However, in these embodiments, the coil 16 is arranged on the separator bowl 11 to rotate with the separator bow 11, and the magnet element 22 is arranged adjacent to the separator bowl 11. Accordingly, except for the reference to the spindle and the generator being arranged at the spindle, the discussion above related to the embodiments of FIGS. 2a-2c, and 3 also relates to these embodiments disclosed in FIGS. 4a and 4b. In FIG. 4b a magnet element 22 comprising at least one electromagnet is shown. Alternatively, a magnet element 22 comprising at least one permanent magnet may be utilised.

Figure 5A:
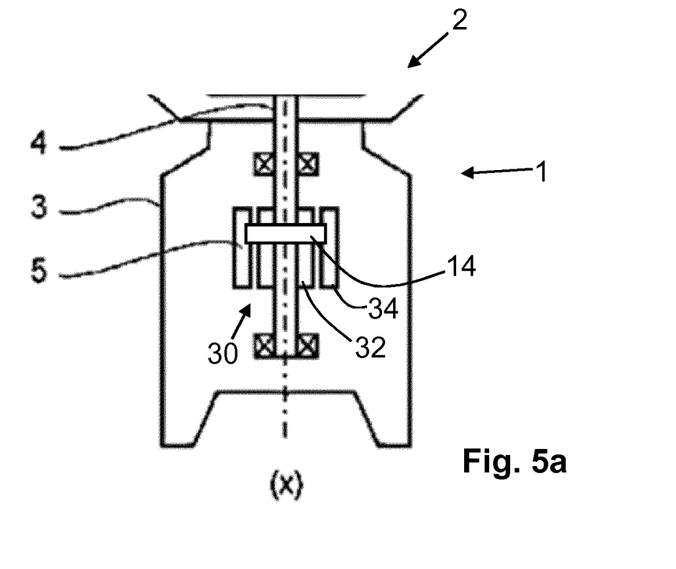
Figure 5B:
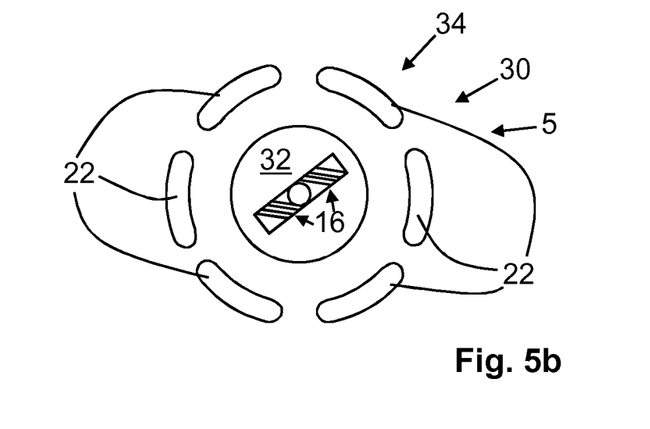

FIG. 5a schematically illustrates a cross section through a drive arrangement 5 of a centrifugal separator 1 according to embodiments. FIG. 5b schematically illustrates a top view of the drive arrangement 5. The centrifugal separator 1 may be a centrifugal separator 1 as discussed above in connection with FIG. 1.

In these embodiments, a generator 14 configured for continuously generating a current during a full revolution of the rotor arrangement 2 of the centrifugal separator 1, is arranged in connection with a drive arrangement 5 of the centrifugal separator 1. Again, the current is utilised for supplying electric current to a user of electric energy arranged in the rotor arrangement 2, e.g. during the full revolution of the rotor arrangement 2.

The drive arrangement 5 is arranged in a housing 3 of the centrifugal separator 1. The drive arrangement 5 is configured to drive a spindle 4 of the rotor arrangement 2.

The generator 14 comprises a coil 16 and a magnet element 22. The drive arrangement 5 comprises an electric motor 30 comprising a rotor 32 and a stator 34. The rotor 32 forms part of the spindle 4 such that the spindle 4 forms part of the drive arrangement 5. The coil 16 of the generator 14 is arranged in a portion of the rotor 32 of the electric motor 30. The magnet element 22 of the generator 14 is formed by at least one magnet member of the stator 34 of the electric motor 30.

The stator 34 of the electric motor 30 comprises magnet members forming magnetic poles. The magnetic poles create a rotating magnetic field, which drives the rotor 32. More specifically, a lag between the rotating magnetic field and the rotor 32 drives the rotor 32. The rotating magnetic field is utilised for generating a continuous AC current in the coil 16 of the generator 14. However, since the magnetic field rotates, and since the coil 16 of the generator 14 rotates with the rotor 32 it is the lag between the rotor 32 and the rotating magnetic field, which causes the magnetic field in the coil 16 to vary and to generate the continuous AC current in the coil 16. The AC current is therefore a low frequency AC current in comparison with the previously discussed generators comprising magnet elements generating static magnetic fields in relation to the rotor arrangement 2.

A current is continuously generated in the different embodiments of generators 14 and their arrangement in centrifugal separators 1 discussed above with reference to FIG. 1, FIGS. 2a-2c, FIG. 3, FIGS. 4a and 4b, and FIGS. 5a and 5b. The current is continuously generated during a full revolution of the rotor arrangement 2 of the relevant centrifugal separator 1. Accordingly, the magnetic field from the magnet element 22 is strong enough to generate the current in the coil 16.

The current continuously generated in the coil 16 of the generator 14 may be a continuous AC current. In the alternative embodiments, the current continuously generated in the coil 16 of the generator 14 may be a continuously pulsed DC current.

Herein the term continuous AC current may relate to an alternating current deviating from 0 mA over at least 70% of a one cycle of the alternating current. Put differently, the waveform representing one cycle of the alternating current has a value larger than 0 mA over at least 70% of one cycle. Thus, a continuous DC current with low deviation from a voltage reference may be provided from a rectifier arrangement 30 connected to the generator 14.

Herein the term continuously pulsed DC current may relate to a pulsed DC current having at least two pulses per full revolution of the rotor arrangement 2 and deviating from 0 mA over at least 70% over a full revolution of the rotor arrangement 2. Thus, a continuous DC current with low deviation from a voltage reference may be provided from a voltage regulator connected to the generator 14.

The current may be provided by a generator 14 wherein the magnet element 22 is configured to provide a magnetic field enclosing the coil 16 during the full revolution of the coil 16. Put differently, the current may be provided by a generator 14 wherein the coil 16 is arranged with in the magnetic field, or magnetic fields, provided by the magnet element 22 during the full revolution of the coil 16. This may be proved in a generator 14 wherein the coil 16 is arranged within a width of the magnet element 22 in a direction perpendicularly to the rotational axis (X).

Accordingly, stable operating conditions may be provided for the user of electric energy in the rotor arrangement 2 of the centrifugal separator 1.

According to some embodiments, the generator 14, during rotation of the rotor arrangement 2, may provide a power of at least 1.2 W, which may be provided at a voltage of e.g. 24 $V_{RMS}$, and a current of 50 mA$_{RMS}$. In such embodiment, the power may be sufficient for supplying electric energy to a user of electric energy 12, comprising e.g. a sensor, and/or a control unit.

According to some embodiments, the generator 14, during rotation of the rotor arrangement 2, may provide a power of at least 6 W, which may be provided at a voltage of e.g. 24 $V_{RMS}$, and a current of 250 mA RMS. In such embodiment, the power may be sufficient for supplying electric energy to a user of electric energy 12, comprising one or more of e.g. a DC motor, an actuator, a capacitor for storing electric energy, a sensor, and/or a control unit.

According to some embodiments, the generator 14, during rotation of the rotor arrangement 2, may provide a power within a range of 1-5 W, which may be provided at a voltage of e.g. 12 $V_{RMS}$ or 24 $V_{RMS}$.

According to some embodiments, the generator 14, during rotation of the rotor arrangement 2, may provide a power within a range of 4-10 W, which may be provided at a voltage of e.g. 12 $V_{RMS}$ or 24 $V_{RMS}$.

The generator 14 is arranged for providing electric energy to a user of electric energy in the rotor arrangement 2 of a centrifugal separator 1. Thus, possibilities are opened up, inter alia for:
  measuring parameters of the centrifugal separator or the separation process inside the rotor arrangement,
  communicating data form the rotor arrangement to a system outside the rotor arrangement,
  communicating from outside the rotor arrangement with e.g. a control system inside the rotor arrangement,
  etc.

Figure 6A:
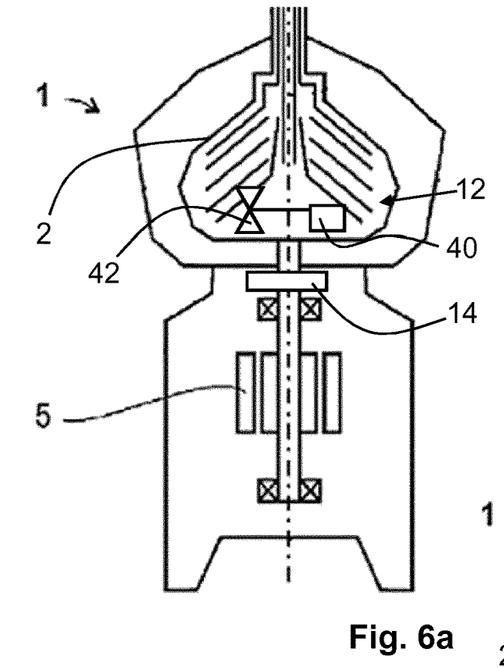

FIG. 6a schematically illustrates a cross section through a centrifugal separator 1 according to embodiments. The centrifugal separator 1 comprises a rotor arrangement 2, a drive arrangement 5, and a generator 14 according to any one of the previously discussed embodiments. Again, a user of electric energy 12 is arranged in the rotor arrangement 2.

In these embodiments, the centrifugal separator 1 comprises an actuator 40 arranged in the rotor arrangement 2. The actuator 40 forms at least part of the user of electric energy 12. The actuator 40 is supplied with electric energy from the generator 14. The user of electric energy 12 may comprise further components or devices in addition to the actuator 40.

According to some embodiments, the centrifugal separator 1 may comprise a valve 42 arranged in the rotor arrangement 2. The actuator 40 may be configured for actuating a movable mechanism of the valve 42. In this manner, the valve 42 may be controlled by the actuator 40, i.e. electric energy provided by the generator 14 may be utilised for controlling a valve arranged in the rotor arrangement 2.

Figure 6B:
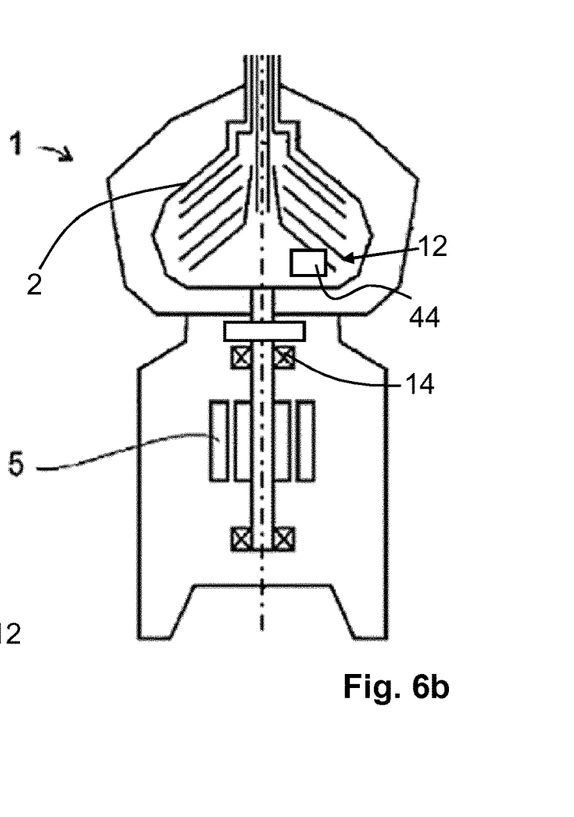

FIG. 6b schematically illustrates a cross section through a centrifugal separator 1 according to embodiments. The centrifugal separator 1 comprises a rotor arrangement 2, a drive arrangement 5, and a generator 14 according to any one of the previously discussed embodiments. Again, a user of electric energy 12 is arranged in the rotor arrangement 2.

In these embodiments, the centrifugal separator 1 comprises a sensor 44 arranged in the rotor arrangement 2. The sensor 44 forms at least part of the user of electric energy 12. That is, the user of electric energy 12 may comprise further components or devices in addition to the sensor 44. The sensor 44 is supplied with electric energy from the generator 14.

Figure 6C:
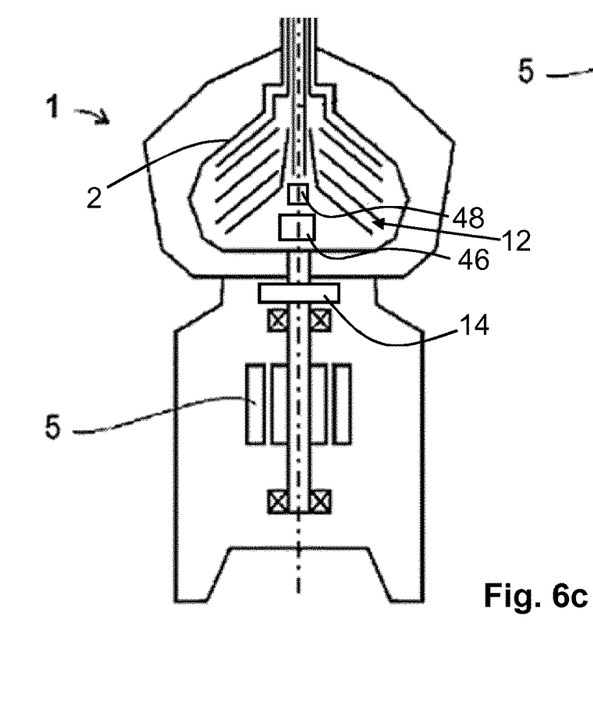

FIG. 6c schematically illustrates a cross section through a centrifugal separator 1 according to embodiments. The centrifugal separator 1 comprises a rotor arrangement 2, a drive arrangement 5, and a generator 14 according to any one of the previously discussed embodiments. Again, a user of electric energy 12 is arranged in the rotor arrangement 2.

In these embodiments, the centrifugal separator 1 comprise a control unit 46 arranged in the rotor arrangement 2. The control unit 46 forms at least part of the user of electric energy 12. That is, the user of electric energy 12 may comprise further components or devices in addition to the control unit 46. The control unit 46 is supplied with electric energy from the generator 14.

With reference to FIGS. 6a-6c, in the rotor arrangement 2 of a centrifugal separator 1, a user of electric energy 12 may comprise one or more of each of the actuator 40, the valve 42, the sensor 44, and the control unit 46, and/or various combinations of one or more of the actuator 40, the valve 42, the sensor 44, and the control unit 46.

In addition thereto, the user of electric energy 12 may comprise a communication unit 48, as exemplified in FIG. 6c. The communication unit 48 may for instance comprise Bluetooth communication device for wireless communication. An alternative communication unit 48 may communicate via the coil 16 of the generator 14. A high frequency communication signal may be transmitted and/or received via the coil 16. The high frequency communication signal is overlaid over the continuous AC current generated in the coil 16. Via the communication unit 48, e.g. data, control instructions, etc. may be sent to/from the rotor arrangement 2.

The different components of a user of electric energy 12 in a rotor arrangement 2 may be connected with each other for communicating data, control instructions, etc. therebetween. In order to reduce centrifugal forces on components of the user of electric energy 12, one or more of the components may be arranged close to the rotational axis of the rotor arrangement 2. The different components of a user of electric energy 12 are supplied, directly or indirectly, with electrical energy from the generator 14.

A few examples of users of electric energy 12, and their function:

The sensor 44 may provide measurement data to the control unit 46 for operation of the centrifugal separator.

The control unit 46 may be connected to the actuator 40 for providing a control signal to the actuator 40.

The communication unit 48 may send measurement data from the sensor 44 to an external recipient of the data.

The communication unit 48 may receive control instructions for the centrifugal separator from an external sender, and send control instructions to the control unit 46.

Figure 7:
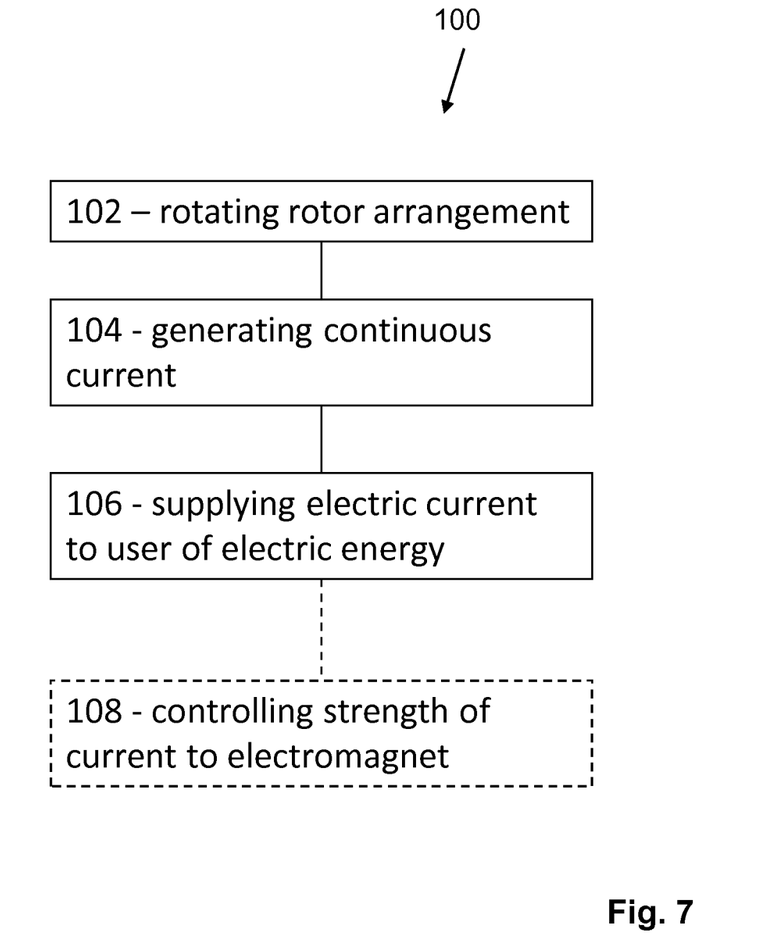
FIG. 7 illustrates a method of operating a centrifugal separator.

FIG. 7 illustrates a method 100 of operating a centrifugal separator. The centrifugal separator may be a centrifugal separator 1 as discussed in connection with FIG. 1 and FIGS. 6a-6c. The centrifugal separator 1 comprises a generator 14 for generating an electric current. The generator may be a generator 14 as discussed in connection with FIGS. 1-5b. Accordingly, the centrifugal separator 1 comprises a rotor arrangement 2, a drive arrangement 5, and a user of electric energy 12. The rotor arrangement 2 has a vertical rotational axis (X) and comprises a spindle 4 and a separator bowl 12. The drive arrangement 5 is connected to, or forms part of, the spindle 4.

The method 100 comprises steps of:
rotating 102 the rotor arrangement 2 about the rotational axis (X) with the drive arrangement 5,
continuously generating 104 a current with the generator 14 during a full revolution of the rotor arrangement 2 during the step of rotating 102 the rotor arrangement 2, and
supplying 106 electric current to the user of electric energy arranged in the rotor arrangement utilising the current generated during the step of continuously generating 104 a current.

According to embodiments, wherein the generator 14 comprises a magnet element 22 arranged stationary in the centrifugal separator 1, wherein the magnet element 22 is arranged to provide a magnetic field extending across the rotational axis (X), wherein the magnet element 22 comprises at least one electromagnet, the method 100 may comprise a step of:
controlling 108 a strength of a current to the at least one electromagnet for changing a strength of the magnetic field provided by the at least one electromagnet.

In this manner, the strength of the current generated by the generator 14 may be controlled as discussed above.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A centrifugal separator comprising:
a rotor arrangement; and
a drive arrangement,
wherein the rotor arrangement comprises a spindle, a separator bowl, and a user of electric energy arranged in the rotor arrangement,
wherein the drive arrangement is connected to, or forms part of, the spindle and is configured to rotate the rotor arrangement about a vertical rotational axis,
wherein the centrifugal separator comprises a generator for generating an electric current,
wherein the generator is configured for continuously generating a current during a full revolution of the rotor arrangement, wherein the current is utilised for supplying electric current to the user of electric energy, wherein the generator comprises a coil arranged to rotate with the rotor arrangement, wherein the coil has a coil axis extending substantially perpendicularly to the rotational axis, wherein the separator bowl has a stack of separation discs, wherein the spindle does not extend into the separator bowl, wherein an inlet pipe extends into the separator bowl, wherein the generator comprises a magnet element arranged stationary in the centrifugal separator, wherein the magnet element is arranged to provide a magnetic field extending across the rotational axis, wherein the coil is arranged on the separator bowl to rotate with the separator bowl, and wherein the magnet element is arranged adjacent to the separator bowl.

2. The centrifugal separator according to claim 1, wherein the coil comprises a first coil portion and a second coil portion, the first and second coil portions being arranged on opposite sides of the rotational axis.

3. The centrifugal separator according to claim 1, wherein the magnet element comprises at least one permanent magnet.

4. The centrifugal separator according to claim 1, wherein the magnet element comprises at least one electromagnet.

5. The centrifugal separator according to claim 4, wherein a strength of a current to the at least one electromagnet is controllable for changing a strength of the magnetic field provided by the at least one electromagnet.

6. The centrifugal separator according to claim 1, comprising an actuator arranged in the rotor arrangement, the actuator forming at least part of the user of electric energy.

7. The centrifugal separator according to claim 1, comprising a sensor arranged in the rotor arrangement, the sensor forming at least part of the user of electric energy.

8. The centrifugal separator according to claim 1, comprising a control unit arranged in the rotor arrangement, the control unit forming at least part of the user of electric energy.

9. The centrifugal separator according to claim 2, wherein the generator comprises a magnet element arranged stationary in the centrifugal separator, and wherein the magnet element is arranged to provide a magnetic field extending across the rotational axis.

10. The centrifugal separator according to claim 1, wherein the generator is above or below the separator bowl.

11. A centrifugal separator comprising:

a rotor arrangement; and a drive arrangement, wherein the rotor arrangement comprises a spindle, a separator bowl, and a user of electric energy arranged in the rotor arrangement, wherein the drive arrangement is connected to, or forms part of, the spindle and is configured to rotate the rotor arrangement about a vertical rotational axis, wherein the centrifugal separator comprises a generator for generating an electric current, wherein the generator is configured for continuously generating a current during a full revolution of the rotor arrangement, wherein the current is utilised for supplying electric current to the user of electric energy, wherein the generator comprises a coil arranged to rotate with the rotor arrangement, wherein the coil has a coil axis extending substantially perpendicularly to the rotational axis, wherein the separator bowl has a stack of separation discs, wherein the spindle does not extend into the separator bowl, wherein an inlet pipe extends into the separator bowl, wherein the generator comprises a magnet element arranged stationary in the centrifugal separator, wherein the magnet element is arranged to provide a magnetic field extending across the rotational axis, wherein the drive arrangement comprises an electric motor comprising a rotor and a stator, wherein the rotor forms part of the spindle such that the spindle forms part of the drive arrangement, wherein the coil of the generator is arranged in a portion of the rotor of the electric motor, and wherein the magnet element is formed by at least one magnet member of the stator of the electric motor.

12. The centrifugal separator according to claim 11, wherein the generator is above or below the separator bowl.

* * * * *